United States Patent [19]

Larsson et al.

[11] Patent Number: 5,234,482
[45] Date of Patent: Aug. 10, 1993

[54] RETARDING VALVE AT A SINGLE-TOWER AIR DRIER

[75] Inventors: Sven-Olof Larsson, Landskrona; Bo Lundström, Glumslöv; Lars M. Severinsson, Hishult, all of Sweden

[73] Assignee: Haldex AB, Sweden

[21] Appl. No.: 813,518

[22] Filed: Dec. 26, 1991

[30] Foreign Application Priority Data

Dec. 27, 1990 [SE] Sweden ............... 9004158

[51] Int. Cl.⁵ .................. B01D 53/04; F16K 31/12
[52] U.S. Cl. .................. 96/113; 137/514.7
[58] Field of Search ............ 251/54, 48, 36; 137/494, 505.13, 509, 510, 514.7, 469; 55/161

[56] References Cited

U.S. PATENT DOCUMENTS

| 859,371 | 7/1907 | Coyle | 251/54 |
|---|---|---|---|
| 1,850,117 | 3/1932 | McMillan | 251/54 X |
| 3,104,861 | 9/1963 | Heyer et al. | 251/54 X |
| 3,730,215 | 5/1973 | Conery et al. | 251/54 X |
| 3,732,889 | 5/1973 | Conery et al. | 251/54 X |
| 3,933,337 | 1/1976 | Morris et al. | 251/54 |
| 4,006,753 | 2/1977 | Ingram, Jr. et al. | 251/331 X |
| 4,402,335 | 9/1983 | Kemmler | 251/48 X |
| 4,900,338 | 2/1990 | Shiomi et al. | 55/161 |

FOREIGN PATENT DOCUMENTS

| 946700 | 8/1956 | Fed. Rep. of Germany | 251/54 |
|---|---|---|---|
| 3139682 | 5/1983 | Fed. Rep. of Germany | |

Primary Examiner—Martin P. Schwadron
Assistant Examiner—Kevin L. Lee
Attorney, Agent, or Firm—Laurence R. Brown

[57] ABSTRACT

A retarding valve at a single-tower air drier for obtaining a controlled time for the flow of regenerating air from an air tank to a desiccant cartridge has a movable valve stem (7), which is provided with a piston (14) having a slightly smaller diameter than a chamber (13), in which it is movable in hydraulic oil (15), so that a narrow circumferential slit for the oil is formed. The valve stem with its piston is biased by a spring (16) from a position—at the beginning of each regenerating cycle—permitting flow through the valve to a position closing off flow through the valve.

6 Claims, 1 Drawing Sheet

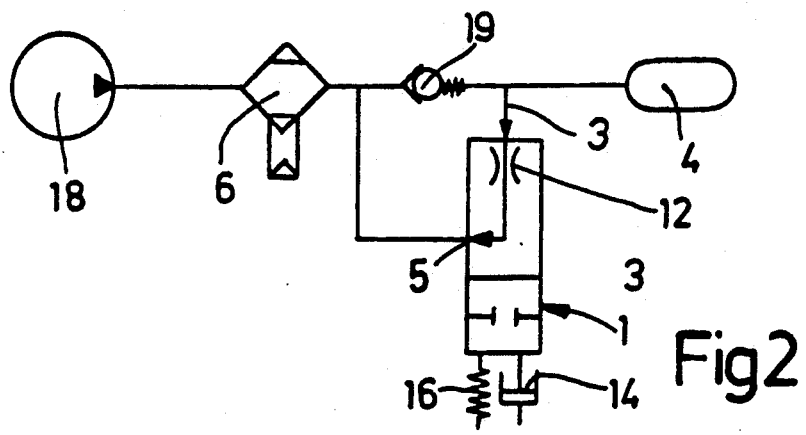
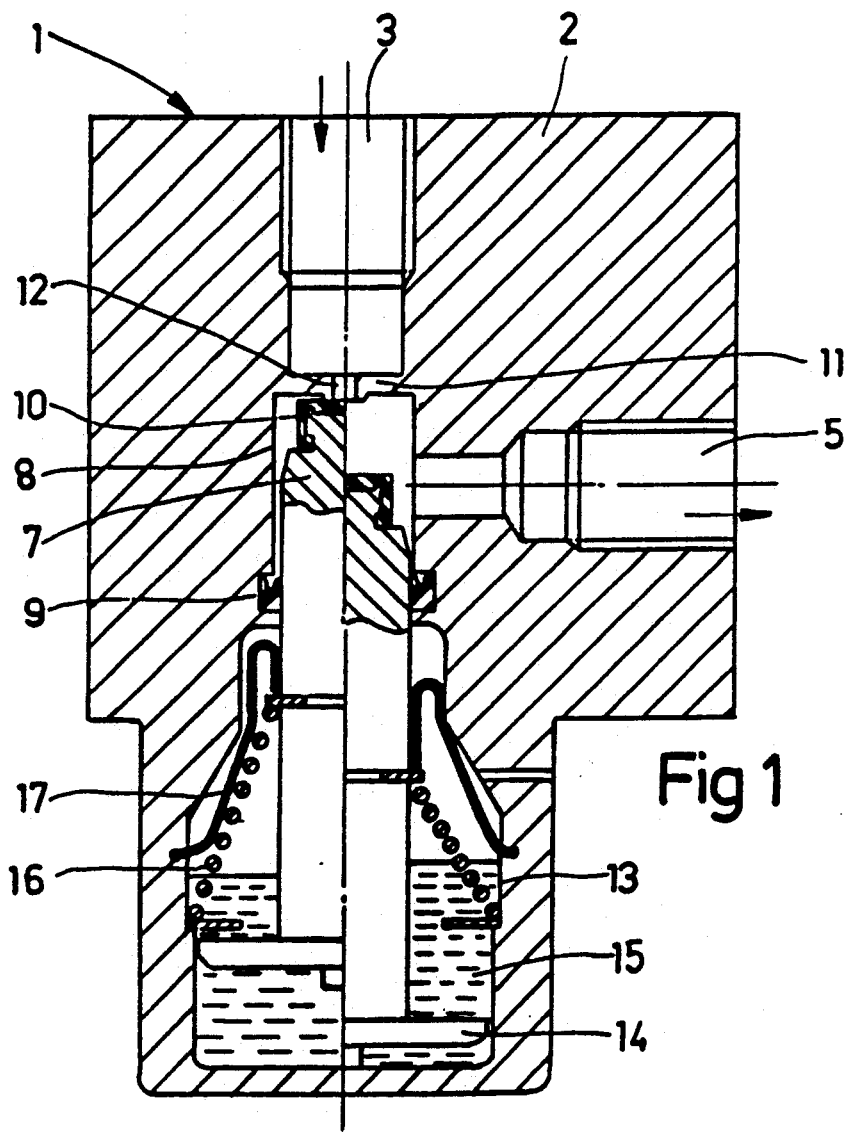

RETARDING VALVE AT A SINGLE-TOWER AIR DRIER

TECHNICAL FIELD

This relates to a retarding valve at single-tower for obtaining a controlled time for the flow of regenerating air from an air tank to a desiccant cartridge.

BACKGROUND OF THE INVENTION

It is well known that the desiccant in an air drier, preferably for use on a vehicle, is regenerated by dry air that is passed backwards through the desiccant and out in the atmosphere thereby removing the moisture gathered by the desiccant, which thereafter will be ready for drying more air coming from the compressor in the system. The regenerating occurs when the compressor has been shut off because no more air is needed in the system.

In a single-tower air drier system there are different principles to govern the regeneration. It is presently preferred to regenerate during a certain time, say 20-30 seconds, after each drying sequence. This controlled time for passing dry air from the air tank through a retarding valve (by-passing a check valve) to the desiccant cartridge may be obtained in different ways.

One method of governing the regeneration time is disclosed in DE-A-3 139 682, where the opening of the valve is electrically controlled by a timer or the like. Another method is disclosed in EP-A-36 569, where a completely pneumatic retarding is obtained with a relatively complex and sensitive system having a spring biased piston, chambers and orifices.

THE INVENTION

The object of the present invention is to obtain a retarding valve, which gives a certain regeneration time with satisfactory accuracy in a simple and reliable way without necessitating any electrical means.

This is according to the invention obtained in that in or past a part associated with a movable valve stem there is a restricted opening for controlled passage of a surrounding liquid, when the valve stem is biased by a spring from a position—at the beginning of each regenerating cycle—permitting flow through the valve to a position closing off flow through the valve.

In a preferred embodiment the valve stem is provided with a piston having a slightly smaller diameter than a chamber, in which it is movable in hydraulic oil, so that a narrow circumferential slit for the oil is formed. The hydraulic oil preferably is silicon oil with high viscosity, for example 30 000 centistoke.

An important advantage with silicon oil is that its viscosity is relatively independent of the temperature. However, in order to compensate also for the still existing change of viscosity with temperature the piston is made of a material with higher coefficient of thermal expansion, for example acetal plastic, than the housing forming the chamber, which may be made of aluminium. By these means it is possible to obtain a regeneration time which is relatively independent of the temperature. It is even possible to obtain a somewhat longer regeneration time at higher temperature, which may be desirable.

There is a restricted bore in the valve for obtaining a controlled flow of regenerating air to the desiccant cartridge, because a better regeneration is obtained with a reduced flow.

BRIEF DESCRIPTION OF THE DRAWING

The invention will be described in further detail below reference being made to the accompanying drawing, in which FIG. 1 is an enlarged view, mostly in cross-section, of a valve according to the invention, shown in two operational positions, and FIG. 2 is a diagram of an air drier arrangement including a valve according to the invention.

DETAILED DESCRIPTION OF A PREFERRED EMBODIMENT

A retarding valve 1 according to the invention for a single-tower air drier has a housing 2 with an inlet port 3 from an air tank 4 on a vehicle and an outlet port 5 to a desiccant cartridge 6 to be regenerated by air from the air tank.

A valve stem 7 is axially movable in a bore 8 in the housing 2, and its upper part has sealed by means of 1 a U-ring 9 arranged in the housing. The upper end of the valve stem 7 is provided with a rubber cap 10 for sealing contact with a valve seat 11 around a restricted bore 12 from the inlet port 3.

Below the U-ring 9 the bore 8 widens into a chamber 13. At its lower end the valve stem 7 is provided with a piston 14. The outer diameter of the piston 14 is only slightly less than the inner diameter of the chamber 13, so that a narrow circumferential slit is left. The lower part of the chamber 13 around the piston 14 is filled with silicon oil 15. The valve stem 7 is biased upwards to contact with the valve seat 11 by a spring 16. There is a sealing rubber boot 17 above the level of the silicon oil 15 between the housing 2 and the valve stem 7.

From the rest position of the valve stem 7 shown to the left in FIG. 1 with the rubber cap 10 in contact with the valve seat 11, a certain pressure in the outlet port 5 presses the valve stem down to the position shown to the right in FIG. 1 against the force of the spring 16 and encountering transfer of the silicon oil 15 past the piston 14. This "loading" of the retarding valve 1 occurs during the operational stage of the system when air from or 18 is supplied to the air tank 4 through t cartridge 6 of the air drier.

When the regeneration of the desiccant is to 1 start, the valve stem 7 is in its bottom position shown to the right in FIG. 1. Dry air from the air tank 4 flows through the inlet port 3, through the restricted bore 12, which has a diameter of for example 1.3 mm in order to control the air flow through the desiccant for obtaining optimal regeneration, and out through the outlet port 5. The normal conduit between the cartridge 6 and the air tank 4 is closed in this flow direction by a check valve 19.

It may be desired to have a regenerating time of for example 20-30 seconds, i.e. the valve stem 7 shall get in closing contact with the valve seat 11 after the desired time under the action of the spring 16 and controlled by the transfer of silicon oil 15 past the piston 14.

Other hydraulic media than silicon oil may be 1 used. Silicon oil is, however, preferred because its viscosity is relatively independent of the temperature. As an example the viscosity of the silicon oil may be in the region of 30,000 centistoke.

However, in order to compensate for the lower viscosity of the silicon oil at rising temperature the housing 2 is made of a material with a lower coefficient of thermal expansion than the piston 14, so that at rising temperature the slit between the housing and the piston becomes narrower. In this way it is possible to make the regeneration time virtually independent of the temperature or even to increase the time somewhat at higher temperatures, which may be desirable.

The housing 2 may for example be made of aluminium and the piston 14 of acetal plastic; other material combinations are also feasible.

The retarding valve according to the invention may be built into the air drier itself or be provided as a separate unit. It has to be mounted in the shown upright position.

We claim:

1. A retarding valve assembly for a single-tower air drier system coupled between an air tank (4) and a desiccant cartridge (6) for controlling time for flow of regenerating air from air tank (4) into the dessicant cartridge (6), comprising in combination:
   a housing (2) defining a chamber (13),
   a liquid (15) in said chamber,
   a movable valve stem (7) movable within said housing to open and close an air flow path between said air tank (4) and said cartridge (6).
   a part (14) movable with step (7) through said liquid (15) structured to define a restricted opening for controlled passage of the liquid (15) in said chamber (13) past said part (14).
   a spring (16) biassing said valve stem (7) toward a position closing said air flow path between said air tank (4) and said cartridge (6), retarding valve loading means (18) for supplying regenerating air to the air tank (4) including structure to move valve stem (7) against the bias of spring (16) to open said air flow path and move the part (14) through the liquid (15) in said chamber (13) in response to pressure in said air flow path between air tank (4) and cartridge (6).

2. A valve according to claim 1 characterized in that the part (14) associated with valve stem (7) comprises a piston (14), said chamber (13) in said housing having a slightly larger diameter than the piston (14) to form a narrow circumferential slit for the oil to flow past the piston, and said liquid (15) comprising hydraulic oil in the chamber surrounding the piston.

3. A valve according to claim 2, characterized in that the hydraulic oil (15) is silicon oil with a high viscosity in the order of 30,000 centistoke.

4. A valve according to claim 2 characterized in that the piston (14) is made of a material with a higher coefficient of thermal expansion than the housing (2) forming the chamber (13).

5. A valve according to claim 4, mounted in a housing (2) characterized in that the piston (14) is made of acetal plastic and the housing (2) of aluminum.

6. A valve according to claim 1, characterized by a restricted bore (12) in said air flow path for obtaining a controlled flow of regenerating air to the desiccant cartridge (6), which bore is closed off by said valve stem (7) under influence of said spring (15).

* * * * *